(12) United States Patent
Deng et al.

(10) Patent No.: US 11,902,641 B2
(45) Date of Patent: Feb. 13, 2024

(54) CAMERA MODULE AND MANUFACTURING METHOD THEREFOR, AND TERMINAL

(71) Applicant: Kunshan QTech Microelectronics Co., Ltd., Suzhou (CN)

(72) Inventors: Aiguo Deng, Jiangsu (CN); Yangliu Xu, Jiangsu (CN); Yuanbin Jin, Jiangsu (CN); Huanhuan Yan, Jiangsu (CN)

(73) Assignee: KUNSHAN QTECH MICROELECTRONICS CO., LTD., Suzhou (CN)

( * ) Notice: Subject to any disclaimer, the term of this patent is extended or adjusted under 35 U.S.C. 154(b) by 451 days.

(21) Appl. No.: 17/292,460

(22) PCT Filed: Nov. 7, 2019

(86) PCT No.: PCT/CN2019/116373
§ 371 (c)(1),
(2) Date: May 10, 2021

(87) PCT Pub. No.: WO2020/094101
PCT Pub. Date: May 14, 2020

(65) Prior Publication Data
US 2022/0021790 A1 Jan. 20, 2022

(30) Foreign Application Priority Data

Nov. 9, 2018 (CN) .......................... 201811336125.6

(51) Int. Cl.
*H04N 23/54* (2023.01)
*H04M 1/02* (2006.01)
*H04N 23/55* (2023.01)
*H04N 23/57* (2023.01)

(52) U.S. Cl.
CPC .......... *H04N 23/54* (2023.01); *H04M 1/0264* (2013.01); *H04N 23/55* (2023.01); *H04N 23/57* (2023.01)

(58) Field of Classification Search
CPC .......................... H04N 23/54–55; G03B 30/00
See application file for complete search history.

(56) References Cited

FOREIGN PATENT DOCUMENTS

WO WO-2019015692 A1 * 1/2019 ............. H04N 5/225

* cited by examiner

*Primary Examiner* — Leon W Rhodes, Jr.
(74) *Attorney, Agent, or Firm* — Andrew C. Cheng

(57) ABSTRACT

Disclosed are a camera module and a method thereof, and a terminal which relates to the field of camera technology. The camera comprises a circuit board, a sensitive chip, a bracket, and a sealing member. At least one side of the bracket is an open side, and a receiving cavity is defined between a surface of the open side facing the circuit board and a first surface of the circuit board. The sealing member is filled in the receiving cavity. The camera module improves the space utilization efficiency, reduces the width of the open side, increases the screen-to-body ratio of the terminal, and improves user's perception and user experience.

20 Claims, 7 Drawing Sheets

CAMERA MODULE AND MANUFACTURING METHOD THEREFOR, AND TERMINAL

CROSS REFERENCE TO RELATED APPLICATIONS

The present application is a 35 U.S.C. § 371 National Phase conversion of International (PCT) Patent Application No. PCT/CN2019/116373, filed on Nov. 7, 2019, the disclosure of which is incorporated by reference herein. The PCT International Patent Application was filed and published in Chinese.

FIELD OF THE INVENTION

The present invention relates to the field of camera technology, and more particularly, to a camera module and manufacturing method thereof, and a terminal.

BACKGROUND OF THE INVENTION

With the development and progress of technology, communication technology has developed rapidly and great progress. With the improvement of communication technology, the popularity of smart electronic products has increased to an unprecedented level, and more and more intelligence terminals or mobile terminals, i.e. intelligence phones, intelligence TVs, and computers have become indispensable in life of people.

With the popularization of terminals, users require more functions and better performance of the terminals. For example, function for playing audio, function for taking photo, function for taking video, and storage function have all become necessary functions of the terminal. Moreover, as users more and more rely on the terminal, the users require the terminals having nice performance in comfort, portability and user experience of the terminal. For example, it is desired to reduce the size, the weight, and the thickness of terminals, and it is also desired to make the screen of the terminal to be as large as possible in order to improve the viewing feeling. This requires further increasing the screen-to-body ratio of the screen of the terminal.

SUMMARY OF THE INVENTION

The present invention provides a camera module and manufacturing method thereof, and a terminal, which can increase the screen-to-body ratio of the terminal.

The embodiments of the present disclosure may be implemented in the following manner, for example:

In an exemplary embodiment, the invention provides a camera module including a circuit board, which including a first end and a second end parallel to and opposite to the first end in a first horizontal direction. The circuit board includes a first surface and a second surface facing away from the first surface in a vertical direction; a sensitive chip, arranged on the first surface of the circuit board, and including a sensitive area and a non-sensitive area surrounding the sensitive area; a bracket, arranged on the first surface of the circuit board and surrounding the sensitive chip, and including several sides, wherein at least one side of the bracket is an open side and a receiving cavity is defined between the surface of the open side facing the circuit board and the first surface of the circuit board; and a sealing member, filled in the receiving cavity.

According to an embodiment of the present disclosure, the bracket is an integrally, formed bracket, and in the horizontal direction, a thickness of the open side of the bracket is smaller than a thickness of the other sides of the bracket.

According to an embodiment of the present disclosure, the bracket further includes a protruding portion at least disposed on the open side, the protruding portion is formed from an end of the open side facing the circuit board extends toward the side where the sensitive chip is located, and the receiving space is defined between the surface of the protruding portion facing the circuit board and the first surface of the circuit board.

According to an embodiment of the present disclosure, the bracket further comprises a stopper at least disposed on the open side, the stopper extends from an end of the protruding portion which is close to the sensitive chip toward the sensitive chip, a free end of the stopper extending toward the sensitive chip contacts with the non-sensitive area of the sensitive chip.

According to an embodiment of the present disclosure, the protruding portion is formed on the open side and the side parallel to and opposite to the open side, the camera module further comprises a filter, and the filter is disposed on a surface of the protruding portion which far away from the circuit board.

According to an embodiment of the present disclosure, the bracket further comprises a side wall at least disposed on the open side, the side wall extends from an end of the protruding portion which far away from the sensitive chip toward a direction away from the circuit board.

According to an embodiment of the present disclosure, the bracket further comprises a side wall and a supporting portion disposed on sides of the bracket except the open side, the supporting portion contacts with and fixed to the first surface of the circuit board, the side wall is connected to one end of the supporting portion which far away from the first surface of the circuit board.

According to an embodiment of the present disclosure, the bracket comprises four sides connected end-to-end; a side disposed at the first end of the circuit board is configured as the open side.

According to an embodiment of the present disclosure, one or more sides of the bracket adjacent to the open side is configured as the open side.

According to an embodiment of the present disclosure, each of the four sides of the bracket comprises the protruding portion.

According to an embodiment of the present disclosure, each of the four sides of the bracket comprises the side wall.

According to an embodiment of the present disclosure, the side wall and the protruding portion of the open side are integrally formed.

According to an embodiment of the present disclosure, the side wall, the protruding portion, and the supporting portion are integrally formed on the sides except the open side.

According to an embodiment of the present disclosure, the receiving cavity is defined by at least the open side, the first surface of the circuit board, and the sensitive chip, in the horizontal direction, a side of the receiving cavity away from the sensitive chip is opened.

In another aspect of the embodiment of the present disclosure, a method of manufacturing a camera module is provided. The method of manufacturing a camera module comprising the following steps: providing a mother board, the mother board comprising a plurality of circuit boards, in a first horizontal direction, each circuit board comprising a first end and a second end parallel to and opposite to the first end; positioning a sensitive chip on a corresponding position of each circuit board; assembling a bracket surrounding the periphery of the sensitive chip of each circuit board correspondingly, at least one side of the bracket being configured as an open side, and a receiving cavity being defined between the surface of the open side facing the circuit board and the first surface facing the open side; forming a sealing member, the sealing member filled in the receiving cavity; and performing a cutting process to form a semi-finished product of separated camera modules.

According to an embodiment of the present disclosure, the mother board comprises a plurality of circuit board groups arranged in a matrix.

According to an embodiment of the present disclosure, each circuit board group comprises two circuit boards, and the first ends of the two circuit boards of each circuit board group on the mother board are adjacent to each other without a gap.

According to an embodiment of the present disclosure, the step of assembling a bracket surrounding the periphery of the sensitive chip of each circuit board correspondingly comprises: configuring a side of the bracket at the first end of each circuit board as the open side, so that the open side at the first end of each circuit board being adjacent to the open side at the first end of another circuit board; assembling the bracket and defining a gap communicating with the receiving cavity between two adjacent open sides to form an adhesive dispensing opening; the step of forming the sealing member comprises: injecting glue into the adhesive dispensing opening to filling the receiving cavity, and solidifying the glue.

According to an embodiment of the present disclosure, the sealing member is formed by solidifying hot pressing glue or photosensitive glue.

In another aspect of the present disclosure, a terminal including a screen and a camera module as above-described is provided. A side of the camera module having the sealing member is disposed adjacent to an upper edge of the screen.

The beneficial effects of the embodiments of the present disclosure are:

In the embodiment of the present disclosure, at least one side of the bracket is configured as an open side, a receiving cavity is defined between the surface of the open side facing the circuit board and the first surface of the circuit board, and a sealing member is filled in the receiving cavity to perform as a supporter. Therefore, a space of the circuit board for receiving the non-sensitive area of the sensitive chip and the area for arranging the resistors and capacitors is shared to avoid an extra occupy to arrange a supporting portion besides the area disposed the non-sensitive area of the sensitive chip and resistors and capacitors on the circuit board. Thus the space utilization efficiency of the camera module is improved, and the width of the open side of the bracket of the camera module is reduced. When the camera module is applied on the terminal, the camera module is able to be close to an edge of the terminal to make an opening of the camera is able to be close to an edge of a screen, thus increasing the screen-to-body ratio of the terminal, and improving user's perception and user experience.

Figure 1:
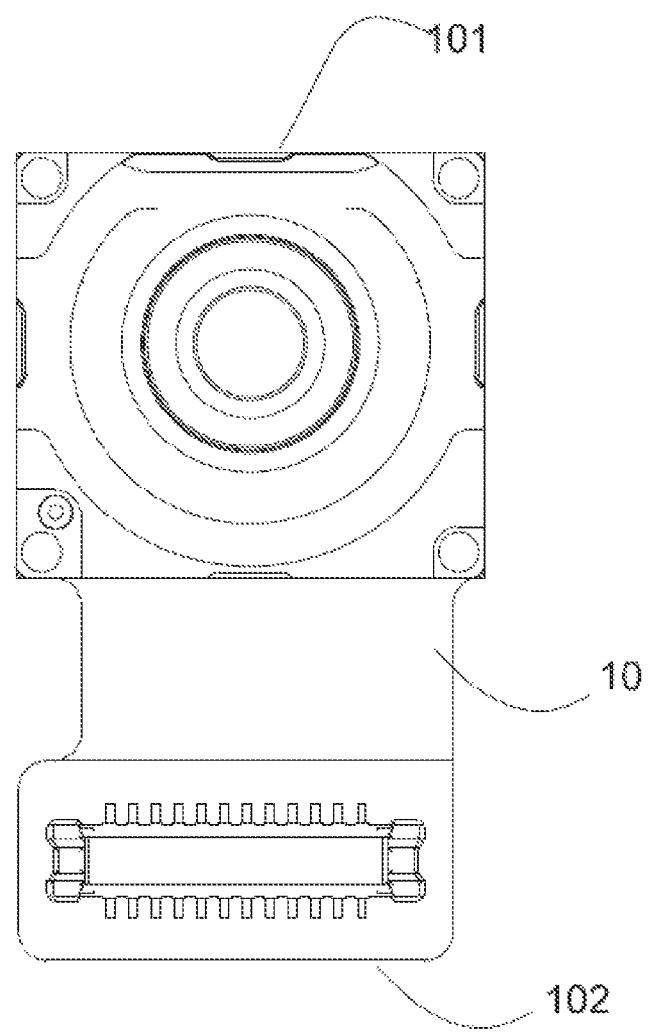
FIG. 1 is a schematic view showing a camera module provided according to an embodiment of the present disclosure.

Drawing reference: 01—mother board; 10—circuit board; 100—circuit board group; 101—first end; 102—second end; 11—first surface; 12—second surface; 20—sensitive chip; 30—bracket; 31—side wall; 311—first side; 312—second side; 313—third side; 314—fourth side; 32—protruding portion; 33—supporting portion; 34—stopper; 40—sealing member; 50—filter; W1—a thickness of the open side; W2—a thickness of the other sides.

DETAILED DESCRIPTION OF PREFERRED EMBODIMENTS

In order to make the purposes, characteristics, and advantages of the embodiments of the present invention more apparently, embodiments of the present disclosure will now be described in more detail with reference to the drawing figures. Obviously, typical embodiments, but not all embodiments are described. The components described and shown in the drawing figures in the embodiments herein may be rearranged and redesigned in different manners.

Therefore, the following detailed description of the embodiments of the present disclosure with reference to the drawing figure is not intended to limit the protection scope of the present disclosure, but merely represents selected embodiments of the present disclosure. Based on the embodiments in the present disclosure, all other embodiments obtained by those of ordinary skill in the art without creative work shall fall within the protection scope of the present disclosure.

It should be noted that similar reference numerals and letters indicate similar items in the following drawing figures. Therefore, once a certain item is defined in a drawing, it does not need to be further defined and explained in the subsequent drawings.

In the description of the present disclosure, it should be noted that the orientation words or relationship words "center", "on", "under", "left", "right", "vertical", "horizontal", "inner" and "outer", etc., are defined by the position of parts in the drawing or the working position of parts for the purpose of clarity and convenience, rather than indicating or implying the referred device or element must have a specific orientation, be configured and operated in a specific orientation. Therefore it is not a limitation of the present disclosure. In addition, the terms "first", "second", "third", etc., are only used for distinguishing elements, and do not indicate or imply importance.

In addition, the terms "horizontal" and "vertical" do not mean that the components are absolutely horizontal or vertical, but may be slightly inclined. For example, "horizontal" only means that its direction is more horizontal than "vertical", it does not mean that the component must be completely horizontal, but may be slightly inclined.

In the description of the present disclosure, it should also be noted that, the terms "dispose", "arrange", and "connect" should be explained in a broad scope unless it is clearly defined into other means. For example, it may be fixed connections, detachable connections, integrally connected, mechanically connected, electrically connected, directly connected, indirectly connected through an intermediate medium, or internal communication between two components. For those of ordinary skill in the art, in different situations the above-mentioned terms in the present disclosure may be different meanings.

Figure 2:
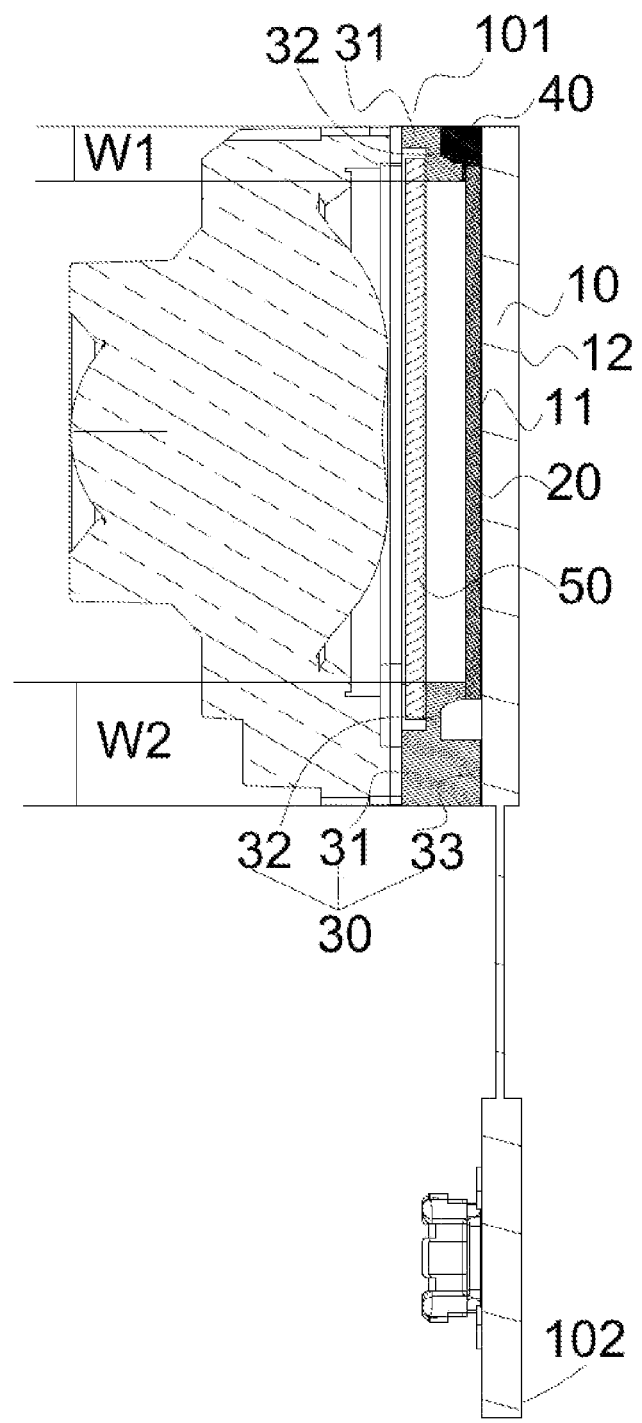
FIG. 2 is a schematic, cross-sectional view showing the camera module of FIG. 1.

Referring to FIG. 1 and FIG. 2, an embodiment of the present invention provides a camera module including a circuit board 10. Specifically, in a first horizontal direction of an extension direction of the circuit board 10, the circuit board 10 may include a first end 101 and a second end 102 arranged parallel to and opposite to the first end 101. In a vertical direction perpendicular to the first horizontal direction, the circuit board 10 includes a first surface 11 and a second surface 12 facing away from the first surface 11. In addition, the camera module may further include a sensitive chip 20 disposed on the first surface 11 of the circuit board 10. The sensitive chip 20 may include a sensitive area and a non-sensitive area surrounding the sensitive area. In addition, the camera module may further include a bracket 30, which is disposed on the first surface 11 of the circuit board 10 and surrounds the sensitive chip 20. At least one side of the bracket 30 is defined as an open side, and a receiving cavity is defined between a surface of the open side facing the circuit board 10 and the first surface 11 of the circuit board 10. A sealing member 40 is filled in the receiving cavity.

It should be noted that the open side may mean that when the bracket 30 is disposed on the first surface 11 of the circuit board 10, the outermost part of the side of the bracket 30 away from the sensitive chip 20 does not completely contact with the first surface 11 of the circuit board 10, but a certain space is formed between the outermost part of the side of the bracket 30 and the first surface 11 of the circuit board 10. Such a side may be called an open side.

The circuit board 10 may also be called a printed circuit board, an integrated circuit board or a PCB circuit board 10, and may be a circuit board manufactured by integrating electronic components and electrical connection elements on a substrate through layout. The circuit board 10 is able to electrical connect various of circuits and components. Generally, circuit connection may be formed by attaching corresponding components at corresponding positions on the circuit board 10 having circuits. In the embodiment of the present disclosure, the circuit board 10 may be substantially rectangular on a horizontal surface. In the present disclosure, for ease of description, in the first horizontal direction, the first end 101 and the second end 102 are defined on the circuit board 10. Specifically, the first end 101 may refer to a side of the circuit board 10 closed to an upper edge of a screen of a terminal when the camera module is assembled in a mobile terminal. The second end 102 may refer to a side parallel to and opposite to the first end 101, that is, a side far from the upper edge of the screen of the mobile terminal.

Referring to FIG. 2, the sensitive chip 20 may be disposed on the first surface 11 of the circuit board 10 and electrically connected with the circuit on the circuit board 10. It should be noted that resistors and capacitors may also be defined on the first surface 11 of the circuit board 10, and the resistors and capacitors are positioned between the sensitive chip 20 and the bracket 30. The sensitive chip 20 may also be referred to an image sensor, such as a Complementary Metal Oxide Semiconductor (CMOS) chip. The sensitive chip 20 includes the sensitive area for sensing lights and the non-sensitive area surrounding the sensitive area. Exemplarily, the non-sensitive area of the sensitive chip 20 is configured to place other circuit connection elements of the sensitive chip 20 thereon and protect the sensitive area.

In an embodiment of the present disclosure, the bracket 30 may be an integrally formed bracket. In the horizontal direction, a thickness of the open side of the bracket 30 W1 is smaller than a thickness of the other sides of the bracket 30 W2, thereby enabling the camera module of the present embodiment being very close to an edge of the screen of the mobile terminal, thus increasing the screen-to-body ratio of the mobile terminal.

In an embodiment of the present disclosure, the receiving cavity is defined by at least the open side, the first surface of the circuit board, and the sensitive chip. In the horizontal direction, the receiving cavity has a side being as from the sensitive chip and opened.

Figure 3:
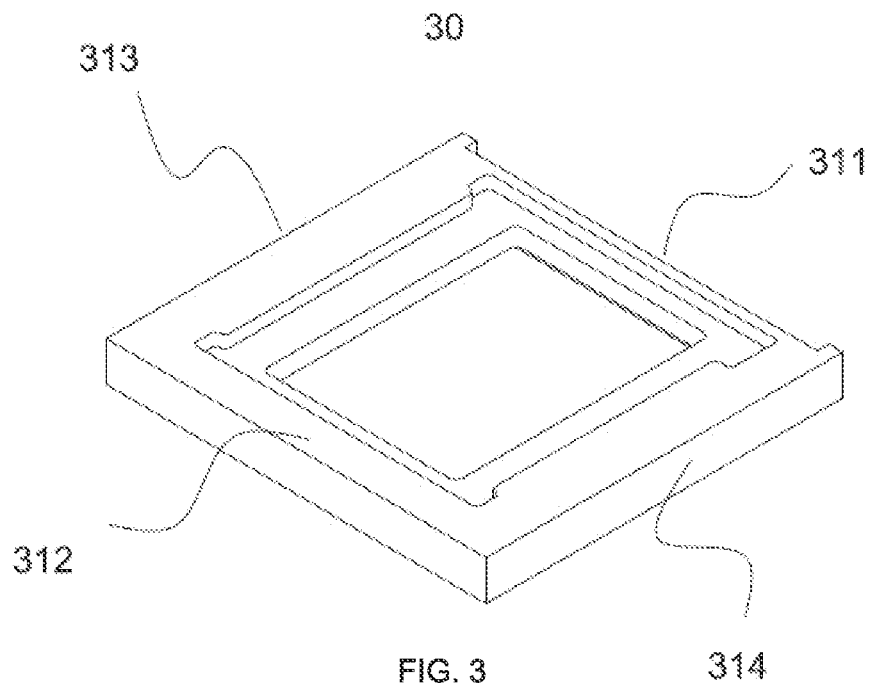
FIG. 3 is a schematic view showing a bracket of an embodiment of the present disclosure.
Figure 4:
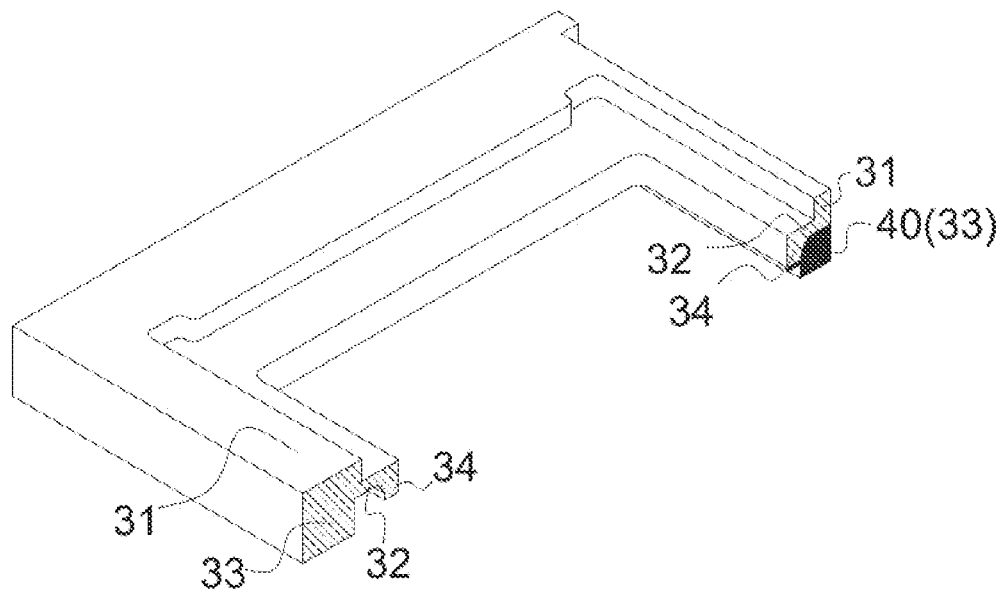
FIG. 4 is a schematic, cross-sectional view showing the bracket of FIG. 3.

In an embodiment of the present disclosure, the bracket 30 may be disposed on the first surface 11 of the circuit board 10. Specifically, as shown in FIG. 3 and FIG. 4, the bracket 30 may include a first side 311 and a second side 312 arranged in the first horizontal direction. The second side 312 is parallel to and opposite to the first side 311. The bracket 30 may also include a third side 313 and a fourth side 314 arranged in a second horizontal direction. The third side 313 is connected to the first side 311 and the second side 312. The fourth side 314 is parallel to and opposite to the third side 313. That is, the first side 311, the third side 313, the second side 312, and the fourth side 314 of the bracket 30 may be connected end-to-end in sequence to form a frame. The bracket 30 may be disposed surrounding the sensitive chip 20 and configured to support components such as a filter 50 and a lens. A middle opening of the frame-shaped bracket 30 may correspond to the sensitive area of the sensitive chip 20. In the embodiment of the present disclosure, exemplarily, a side of the bracket 30 located at the first end 101 of the circuit board 10 may be named the first side 311 of the bracket 30, but it is not limited to this. A side of the bracket 30 located at the first end 101 of the circuit board 10 may also be named the second side or the third side of the side of 30, etc.

Specifically, referring to FIG. 2 to FIG. 4, the first side 311 of the bracket 30 located at the first end 101 of the circuit board 10 may be the open side. Specifically, when the bracket 30 is assembled to the circuit board 10, the outermost part of the first side 311 away from the sensitive chip 20 does not completely contact with the first surface 11 of the circuit board 10, but a certain space is formed between the outermost part of the first side 311 and the first surface 11 of the circuit board 10. Such that the first side 311 is defined as the open side. In the embodiment of the present disclosure, the bracket 30 may include a protruding portion 32, which may extend from a surface of the bracket 30 facing the circuit board 10 toward the sensitive chip 20. At the position of the open side (the first side 311), the receiving cavity is defined by a surface of the protruding portion 32 facing the circuit board 10 and the first surface 11 of the circuit board 10. In the embodiment of the present disclosure, the bracket 30 may include several sides. In another embodiment of the present disclosure, the bracket 30 may include four sides. Each of the four sides of the bracket 30 may have the protruding portion 32, and of course, it is not limited to this. In other embodiments, the protruding portion 32 may be provided only on the open side, or only on the open side and the side parallel to and opposite to the open side, or even no protruding portion 32 may be provided.

In the embodiment of the present disclosure, the bracket 30 may further include a side wall 31. Specifically, referring to FIG. 4, in the vertical direction, the side wall 31 extends from an end of the protruding portion 32 which far away from the sensitive chip 20 and extends toward a direction away from the circuit board 10, that is, the side wall 31 is disposed on an end of the protruding portion 32 away from the sensitive chip 20. Relative to the sensitive chip 20, the protruding portion 32 is positioned at an inside of the side wall 31 and extends toward the sensitive chip 20. The protruding portion 32 and the side wall 31 are connected to form an "L"-shaped step for supporting the filter 50. In the embodiment of the present disclosure, the four sides of the bracket 30 may all have side walls 31, and it is not limited to this certainly. In other embodiments, the side walls 31 may be provided only on the open side, or only on the open side and the sides parallel to and opposite to the open side, or even no side wall 31 may be provided.

In the embodiment of the present disclosure, the bracket 30 may further include a supporting portion 33 on the sides except the open side (the first side 311). Specifically, referring to FIG. 2 and FIG. 4, a first end of the support portion 33 facing the circuit board 10 in the vertical direction may be in contact with and fixed to the first surface 11 of the circuit board 10 for supporting the bracket 30. A second end of the supporting portion 33 opposite to the first end may be connected to a lower end of the side wall 31 away from the sensitive chip, that is, the supporting portion 33 is positioned below the side wall 31 and the protruding portion 32. An end of the supporting portion 33 is connected to the side wall 31, and the other end is disposed on the first surface 11 of the circuit board 10, thus supporting the bracket 30 and the filter 50.

In the embodiment of the present disclosure, referring to FIG. 2 and FIG. 4, the sealing member 40 may be filled within the receiving cavity formed by a surface of the protruding portion 32 of the open side (the first side 311) of the bracket 30 facing the surface of the circuit board 10 and the first surface of the circuit board 10. More specifically, at the open side (the first side 311) of the bracket 30, the sealing member 40 may be positioned at a side of the side wall 31 and the protruding portion 32, and the side faces the circuit board 10. One end of the sealing member 40 may be connected to the side wall 31 and the protruding portion 32, and the other end may be disposed on the circuit board 10 for supporting the same as the supporting portion 33. Therefore, no supporting portion 33 is formed on the open side, so that the thickness of the open side W1 is smaller than the thickness of the other sides W2. When the camera module of the embodiment of the present disclosure is applied to a mobile terminal, a distance between the open side of the camera module of the embodiment of the present disclosure and the edge of the screen of the terminal may be effectively reduced, thereby making the camera module and an opening of the camera module being very close to the edge of the screen of terminal, thus increasing the screen-to-body ratio of the terminal and improving the user's perception and experience.

In the embodiment of the present disclosure, the bracket 30 may be integrally formed, and the bracket 30 may be made of one or more of ABS plastic, PPS plastic, and PS plastic. That is, in the embodiment of the present disclosure, the side wall 31 and the protruding portion 32 may be integrally formed at the open side (the first side 311) of the bracket 30. The receiving cavity is defined by the surface of the protruding portion 32 facing the circuit board 10 and the first surface 11 of the circuit board 10, and the sealing member 40 may be filled in the receiving cavity to act as a supporter. The side wall 31, the protruding portions 32, and supporting portion 33 may be integrally formed at the other three sides of the bracket 30 with the supporting portion 33 acting as a supporter.

Specifically, the sealing member 40 may be formed by solidifying the glue after glue dispensing. In the embodiments of the present disclosure, the limitation on position and width of the sealing member 40 refers to position and width of the solidified sealing member 40 which has a fixed shape.

The camera module of the embodiment of the present disclosure may optionally be used as a front camera. In order to enable the mobile terminal having a function of taking pictures of objects in the front of the terminal, the camera module of the embodiment of the present disclosure may be disposed on a side having the screen of the terminal. In order to make the camera module occupying an area of the screen as small as possible, thereby increasing a percent of the area of the screen to the area of the front of the terminal, the first end 101 of the front camera module may be disposed as close as possible to the upper edge of the screen. The thickness of the side of the bracket 30 at the position of the first end 101 of the circuit board 10 (the thickness of the open side W1) of the camera module is reduced, therefore the camera module of the embodiment of the present disclosure may be adjacent to the upper edge of the screen of the terminal, thereby increasing the screen-to-body ratio of the terminal.

Specifically, in the embodiments of the present disclosure, the glue may flow to the non-sensitive area of the sensitive chip 20, the resistors and capacitors on the circuit board 10 for the glue can flow. The glue which flowing to the non-sensitive area of the sensitive chip 20, and the resistors and capacitors is solidified to form the sealing member 40 to act as a supporter. That is, the sealing member 40 acting as a supporter makes the sealing member 40 sharing a space with the non-sensitive area of the sensitive chip 20, the resistors and capacitors in the embodiment of the present disclosure, thus avoiding to occupy extra area to arrange a supporting portion 33 besides the area to arrange the non-sensitive area of the sensitive chip 20 and the resistors and capacitors on the circuit board 10. Therefore, a space efficiency is improved and the thickness of the bracket 30 of the camera module at the first end 101 (the thickness of the open side W1) is reduced. When the camera module is applied in the terminal, the camera module may be close to the upper edge of the screen of the terminal to make the opening of the camera module also be close to the upper edge, thereby improving the screen-to-body ratio of the terminal.

In some embodiments, optionally, referring to FIG. 4, the bracket 30 may further include a stopper 34. The stopper 34 extends from an end of the protruding portion 32 close to the sensitive chip 20 toward the sensitive chip 20. That is, one end of the stopper 34 is connected to the end of the protruding portion 32 close to the sensitive chip 20. The other end (free end) of the stopper 34 may be disposed on the non-sensitive area of the sensitive chip 20. Thereby, at the open side (the first side 311) of the bracket 30, an outer side of the stopper 34 (the side away from the sensitive chip 20 in the horizontal direction), the surface of the protruding portion 32 facing the circuit board 10, and the first surface 11 of the circuit board 10 may cooperatively form the receiving cavity, and the sealing member 40 is filled in the receiving cavity.

For example, referring to FIG. 2, when the filter 50 is disposed on the surface of the protruding portion 32 away from the circuit board 10, the side wall 31 protruding beyond an upper side of the protruding portion 32 may make the filter 50 in position. The side wall 31 prevents the filter 50 from moving in the horizontal direction. Exemplarily, the range enclosed by the side walls 31 may match the outer perimeter of the filter 50 to define a movable range of the filter 50 on the protruding portion 32. Referring to FIG. 2, in order to clearly show the relationship of the components in the camera module, a gap is shown between the edge of the filter 50 and the side wall 31 of the bracket 30. However, in fact, Under the premise of ensuring to assemble the filter 50 and the side wall 31 in an assembly error, a perimeter of the filter 50 should be matched with a perimeter the side wall 31, so that the side wall 31 may prevent the filter 50 from moving relative to the protruding portion 32 in the horizontal direction. Therefore, a compact and stable camera module is provided.

In the embodiment of the present disclosure, at the open side of the bracket 30, the stopper 34 is able to prevent the uncured sealing member 40 from flowing to a position beyond the shared space of the sensitive chip 20, especially prevent the glue from flowing to the sensitive area of the sensitive chip 20. Therefore, the possibility of the sensitive area of the sensitive chip 20 polluted by the glue is greatly decreased.

More specifically, the stopper 34 may be disposed on the non-sensitive area of the sensitive chip 20 close to the sensitive area, so that the non-sensitive area of the sensitive chip 20 can be fully utilized to form the sealing member 40. Therefore, a space of the circuit board 10 for receiving the non-sensitive area of the sensitive chip 20 and the area for arranging the resistors and capacitors is shared to arranging the sealing member 40.

In the above-mentioned embodiments of the present disclosure, a space of the circuit board 10 for receiving the non-sensitive area of the sensitive chip 20 and the area for arranging the resistors and capacitors is shared, thus avoiding an extra occupy to arrange a supporting portion 33 besides the area disposed the non-sensitive area of the sensitive chip 20 and the resistors and capacitors on the circuit board 10. Therefore, a space efficiency is improved, and the thickness of the open side of the bracket 30 at the first end 101 of the circuit board 10 W1 is smaller than the thickness of other sides of the bracket 30 W2. Specifically and exemplarily, in an embodiment of the present disclosure, as shown in FIG. 2, the thickness of the first side 311 of the bracket 30 (the thickness of the open side W1) may be smaller than the thickness of other sides of the bracket 30 (the second side 312, the third side 313, and the fourth side 314) W2. Therefore, when the camera module is applied to the terminal, the camera module may be close to the upper edge of the screen of the terminal, so that the opening of the camera module on the screen is also close to the upper edge. Therefore the screen-to-body ratio of the terminal is improved.

In other embodiments of the present disclosure, the first side 311 and the side adjacent to the first side 311 of the bracket 30, such as the third side 313 or the fourth side 314, may be open sides. The sealing member 40 may be disposed on the first side 311 of the bracket 30 at the first end 101 of the circuit board 10, and filled in the receiving cavity formed by the surface of the first side 311 of the bracket 30 facing the circuit board 10 and the first surface 11 of the circuit board 10. And the sealing member 40 may also be disposed on the side adjacent to the first side 311 of the bracket 30, such as the third side 313 or the fourth side 314, and filled in the receiving cavity defined by the third side 313 or the fourth side 314 of the bracket 30 and the first surface 11 of the circuit board 10. In other embodiments, only the third side 313 or the fourth side 314 of the bracket 30 are configured as the open side, and the sealing member 40 is filled in the receiving cavity defined by the surface of the open side of the bracket 30 facing the circuit board 10 and the first surface of the circuit board 10. Therefore a width of the open side in the first horizontal direction is decreased, and a size of the camera module is decreased either.

Optionally, the sealing member 40 may be formed by solidifying hot pressing glue or photosensitive glue.

Specifically, the sealing member 40 may be formed by solidifying hot pressing glue. Hot pressing glue may be a single-layer heat vulcanizing adhesive, which has a good performance to adhere metal or materials which are difficult to adhere. Generally, hot pressing glue may be solidified in a dry environment at room temperature. In order to adhere metal difficult to adhere, it may be baked at 80 centigrade for five minutes firstly, and then be vulcanizing adhered, thus obtaining a good performance in adhering. Alternatively, the sealing member 40 may be formed by solidifying photosensitive glue. Photosensitive glue, also known as ultraviolet rays adhesive (UV adhesive for short), is a kind of glue that is solidified by ultraviolet light. Photosensitive glue may be solidified and fixed in a few seconds, thus greatly improving the efficiency of adhering. Solidified photosensitive glue has a long service life. It should be noted that the photosensitive glue may also be solidified by natural light. However, it takes a shorter time and has a higher efficiency to solidify the photosensitive glue by ultraviolet light than to solidify the photosensitive glue by natural light.

Figure 5:
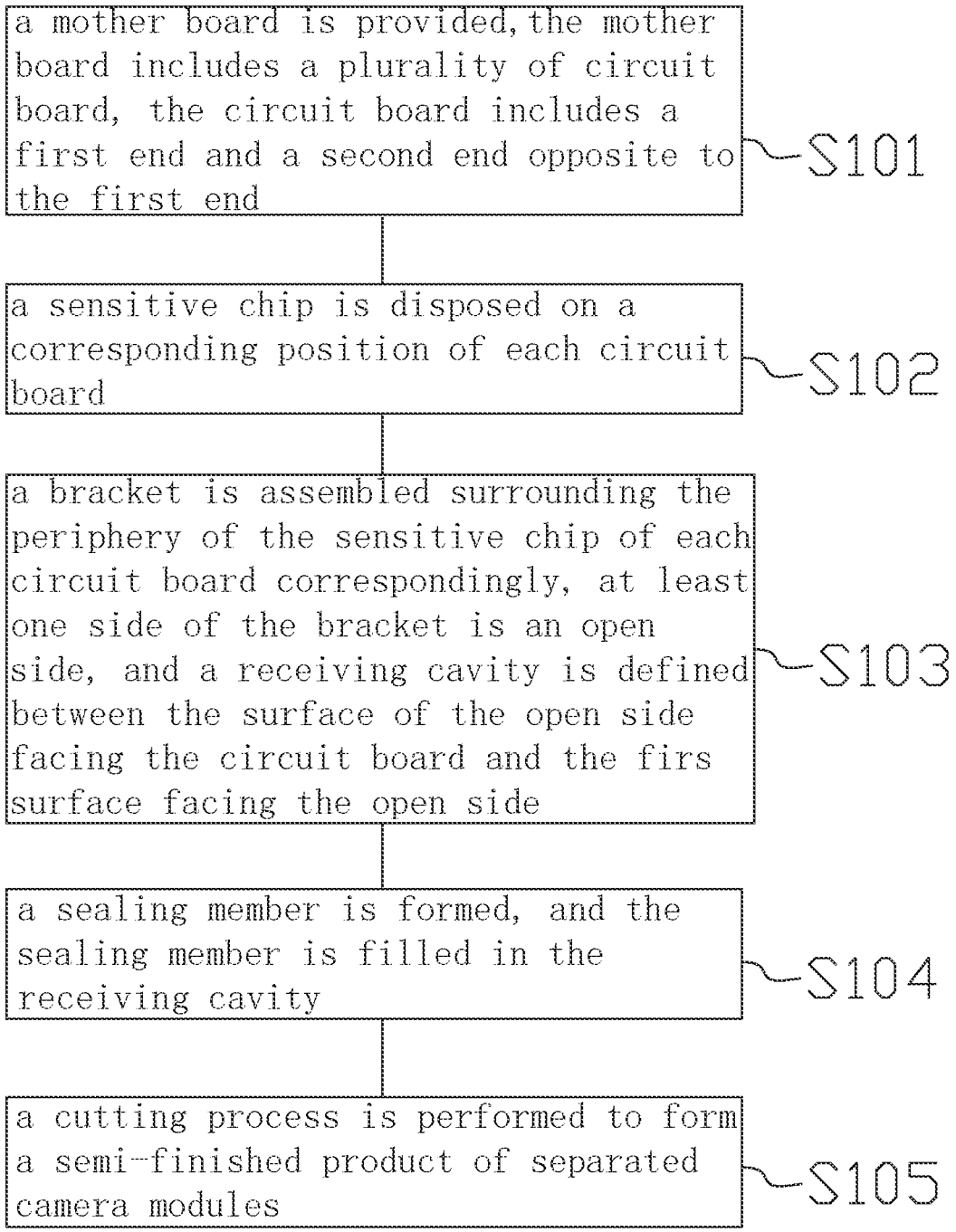
FIG. 5 is a flowchart of a method of manufacturing a camera module of an embodiment of the present disclosure.

In another aspect of the embodiments of the present disclosure, a method for manufacturing a camera module is provided, as shown in FIG. 5, which may include the following steps:

S101, a mother board 01 is provided. The mother board 01 may include a plurality of circuit boards 10. In a first horizontal direction of an extension direction of the circuit board 10, the circuit board 10 may include a first end 101 and a second end 102 parallel to and opposite to the first end 101.

Figure 6:
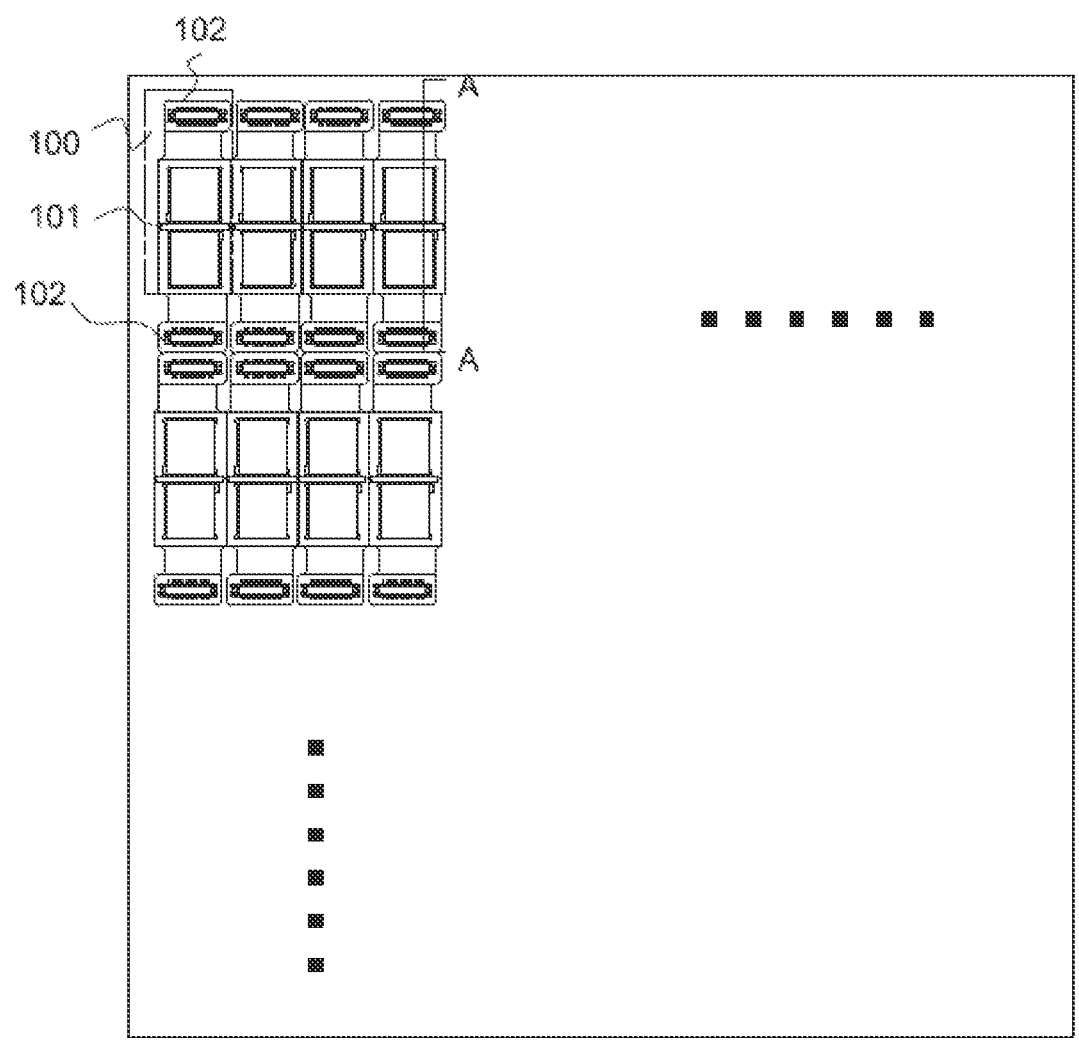
FIG. 6 is a schematic view showing a motherboard of an embodiment of the present disclosure.

Specifically, in a specific embodiment of the present disclosure, referring to FIG. 6, the motherboard 01 may include a plurality of circuit board groups 100 arranged in a matrix. Each circuit board group 100 may include two circuit boards 10, and each circuit board 10 may include a first end 101 and a second end 102 parallel to and opposite to the first end 101 in the first horizontal direction. The first end 101 of each circuit board 10 may be adjacent to the first end 101 of another circuit board 10.

In the actual manufacturing process, firstly, a plurality of circuit board groups 100 may be arranged on the mother board 01 exemplarily in a matrix. Specifically, for example, a plurality of circuit board groups 100 arranged in a matrix may be printed at a predetermined position of the mother board 01, or a plurality of circuit board groups 100 may be laid in a matrix to form the motherboard 01. Wherein, a number of the circuit board groups 100 may be confirmed according to requirements, which is not limited in the embodiment of the present disclosure. Exemplarily, referring to FIG. 6, the number of the circuit board groups 100 arranged on the motherboard 01 is N. For convenience of illustration, only eight groups including sixteen circuit boards 10 are shown in FIG. 6. The first end 101 of one circuit board 10 may be arranged adjacent to the first end 101 of the other circuit board 10 in each circuit board group 100. Optionally, the N groups of circuit board groups 100 may be arranged in an array to form the motherboard 01. Wherein the item "adjacent to" means the first ends 101 of the two circuit boards 10 stand against each other without defining a gap therebetween. Exemplarily, when a plurality of circuit board groups 100 are printed at the predetermined position of the mother board 01, no gap is defined between the first ends 101 of the two circuit boards 10 of the circuit board group 100. When a plurality of circuit board groups 100 are laid to form the motherboard 01, no gap is defined between the first ends 101 of the two circuit boards 10 of the circuit board group 100. For ease of understanding, when the first end 101 of the circuit board 10 is called the "head portion", and the second end 102 parallel to and opposite to the first end 101 is called the "end portion", the circuit board 10 may be arranged in such a way that the "head portion" resist against the "head portion" and the "end portion" resist against the "end portion" in the motherboard 01. Certainly, a gap may be defined between the end portions.

S102, a sensitive chip 20 is disposed on a corresponding position of each circuit board 10.

Specifically, a sensitive chip 20 may be assembled on each circuit board 10 on the mother board 01 by die bonding (D/B). That is, one sensitive chip 20 is provided on each circuit board 10 to manufacture a camera module.

Certainly, some other manufacturing steps may be performed to manufacture the camera module. For example, a wire bonding (W/B) process and a cleaning process may be performed after die bonding. It should be noted that the steps are not important in the present disclosure, and are well known to those skilled in the art, thus will not be detailed described.

S103, a bracket 30 is assembled surrounding the periphery of the sensitive chip 20 of each circuit board 10 correspondingly. At least one side of the bracket 30 may be an open side, and a receiving cavity is defined between the surface of the open side facing the circuit board 10 and the first surface facing the open side.

In this step, a bracket 30 is assembled surrounding the periphery of the sensitive chip 20 of each circuit board 10. Specifically, the bracket 30 may be pre-manufactured and then are assembled on the circuit board 10.

The pre-manufactured bracket 30 is assembled on the circuit board 10 by holder mounting process (H/M). Specifically, referring to FIG. 3 and FIG. 4, in the first horizontal direction, the pre-manufactured bracket 30 may include a first side 311 and a second side 312 parallel to and opposite to the first side 311. In a second horizontal direction, the bracket 30 may further include a third side 313 connecting to the first side 311 and the second side 312, and a fourth side 314 parallel to and opposite to the third side 313. That is, the first side 311, the third side 313, the second side 312, and the fourth side 314 of the bracket 30 may be connected end-to-end to form a frame.

In this step, assembling a bracket 30 surrounding the periphery of the sensitive chip 20 on each circuit board 10 may include: configuring the side of the bracket 30 at the first end 101 of each circuit board 10 as an open side, so that the open side of the bracket 30 located at the first end 101 of each circuit board 10 is adjacent to the open side of the bracket 30 located at the first end 101 of the other circuit board 10. Certainly, it is not limited to this. In other embodiments, the first side 311 and the side adjacent to the first side 311, such as the third side 313 or the fourth side 314 of the bracket 30 may also be configured as an open side. Alternatively, only the third side 313 or the fourth side 314 of the bracket 30 may be configured as an open side. When only the third side 313 or the fourth side 314 is configured as an open side, the third side 313 or the fourth side 314 on each circuit board 10 should be adjacent to the third side 313 or the fourth side 314 on another circuit board 10.

Figure 7:
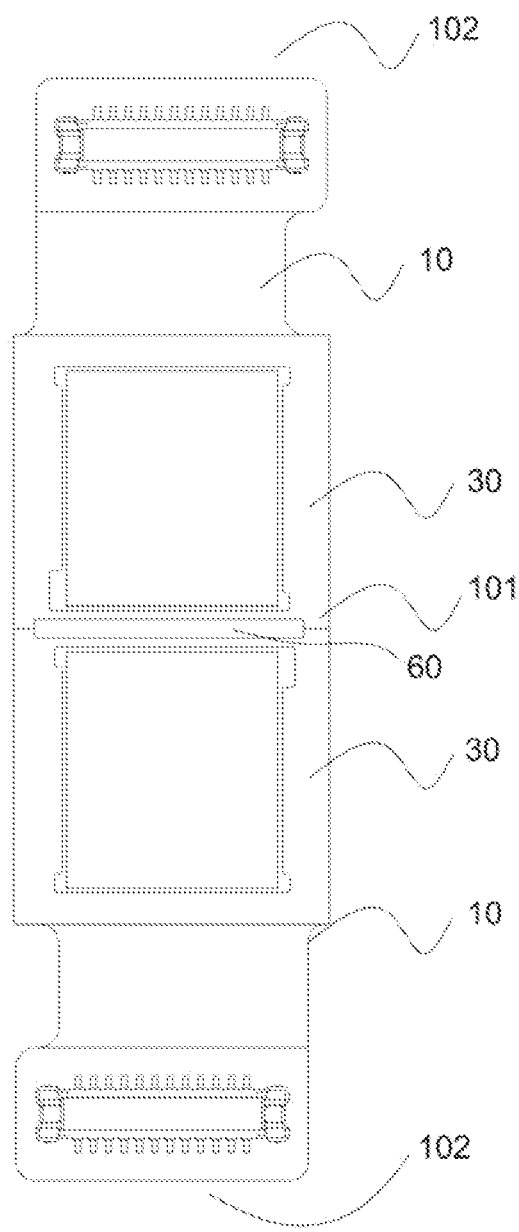
FIG. 7 is a schematic view showing circuit board groups of an embodiment of the present disclosure.
Figure 8:
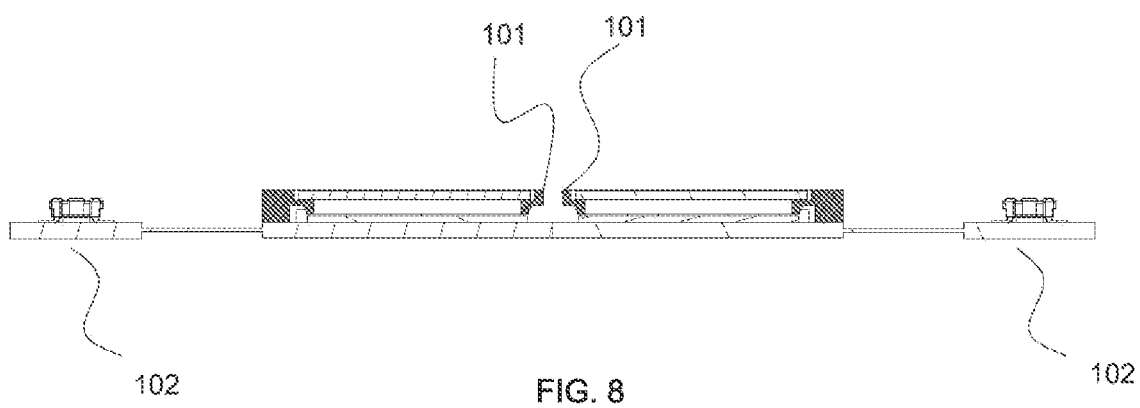
FIG. 8 is a schematic, cross-sectional view showing the circuit board group of FIG. 7 without dispensing glue.

During assembling the bracket 30, a gap 60 communicating with the receiving cavity may be defined between two adjacent open sides to form an adhesive dispensing opening.

Wherein a gap 60 communicate with the receiving cavity defined between two adjacent open sides to form an adhesive dispensing opening means that at the first ends 101 of the two circuit boards 10, part of the side walls 31 at the first sides 311 do not contact completely, but defining the gap 60 as the adhesive dispensing opening, as shown in FIG. 7 and FIG. 8 exemplarily. Alternatively, in another embodiment without a sidewall 31, a gap 60 communicate with the receiving cavity defined between two sides to form an adhesive dispensing opening means that the protruding portions 32 of the first sides 311 of two brackets 30 do not contact completely, but defining a gap 60 as the adhesive dispensing opening. Specifically, the size of the gap 60 is not specifically limited in the embodiments of the present disclosure, and may be determined by those skilled in the art, so long as glue can enter the receiving cavity communicating to the adhesive dispensing opening through the adhesive dispensing opening.

It should be noted that the pre-manufactured bracket 30 may be a combined bracket including a plurality of brackets 30, and be assembled on the motherboard 01 by H/M process for one time. As shown in FIG. 7, in the circuit board group 100, at the position of the first ends 101 of two circuit boards 10 adjacent to each other, a part of the side wall 31 at the position of the first wall 311 of two brackets 30 are connected to each other, thereby forming a combined bracket having a plurality of brackets 30. The pre-manufactured bracket 30 may also be formed by mounting several separate brackets 30 on the circuit boards 10 by H/M process for a couple of times. The embodiment of the present disclosure is not limited to above described, so long as one bracket 30 is assembled on corresponding position of each circuit board 10 finally.

S104, forming a sealing member 40, and the sealing member 40 is filled in the receiving cavity.

In this step, forming the sealing member 40 may mean that injecting glue into the adhesive dispensing opening to filling the receiving cavity, and the glue is solidified to form the sealing member 40. Specifically, in the embodiments of the present disclosure, the equipment to dispensing glue is not limited. Firstly, when the glue is dispensed into the receiving cavity through the adhesive dispensing opening, in the actual operation, a dispensing time may be determined by calculating the amount of glue and the flow time. Thereby, not only a glue consumption can be satisfied, but also the uncured glue is prevented from flowing to the sensitive area of the sensitive chip 20. Then the glue may be solidified to form the sealing member 40 so as to provide a supporter as strong as possible in a limited space.

Figure 9:
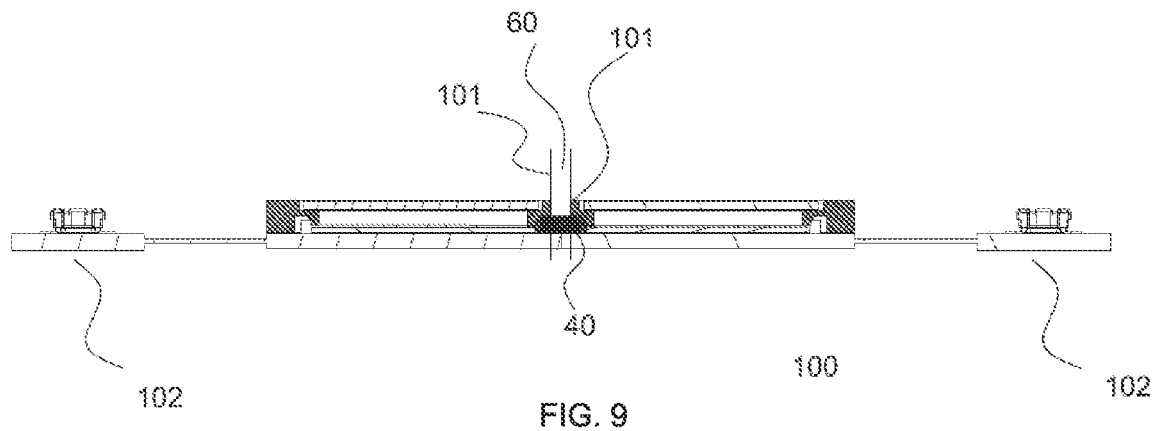
FIG. 9 is a cross-sectional view showing the circuit board group of FIG. 7 after forming a sealing member.

Preferably, as shown in FIG. 9, in order to prevent the uncured glue from flowing to the sensitive area of the sensitive chip 20, the bracket 30 may further include a stopper 34 extending from an end of the protruding portion 32 close to the sensitive chip 20 toward the sensitive chip 20. One end of the stopper 34 is connected to the end of the protruding portion 32 close to the sensitive chip 20, and the other end (free end) of the stopper 34 contacts the non-sensitive area of the sensitive chip 20. More specifically, the stopper 34 may be disposed on the non-sensitive area of the sensitive chip 20 close to the sensitive area. At the open side of the bracket 30, the outer side of the stopper 34 (the side away from the sensitive chip 20 in the horizontal direction), the surface of the protruding portion 32 facing the circuit board 10, and the first surface 11 of the circuit board 10 may cooperatively define the receiving cavity, thereby the glue may flow into the receiving cavity through the adhesive dispensing opening. The stopper 34 withholds the glue to prevent the uncured glue from flowing to the sensitive area of the sensitive chip 20. Therefore the possibility of the sensitive area of the sensitive chip 20 polluted by the glue is decreased, thus of the non-sensitive area of the sensitive chip 20 may be maximization utilized.

The adhesive dispensing opening may have a large size via cutting extra portions in the subsequent cutting step. Referring to FIG. 9, there are two pre-cut processes (as shown by the vertical solid line in FIG. 9), and extra portion is cut twice in the subsequent cutting step.

S105, performing a cutting process to form a semi-finished product of separated camera modules.

Referring to FIG. 1, separated semi-finished camera modules are formed with performing the cutting process on the mother board 01. It is called a semi-finished camera module because other components such as a lens are not assembled thereon. After the lens and other components are assembled, a finished camera module is finally formed.

It should be noted that in the embodiment of the present disclosure, a manner to separate the camera modules is not limited. For example, as shown in FIG. 9, it may be cut twice along the direction along the solid line in FIG. 9 to remove the portion between the two cutting lines. Thus, two semi-finished camera modules are formed.

Figure 10:
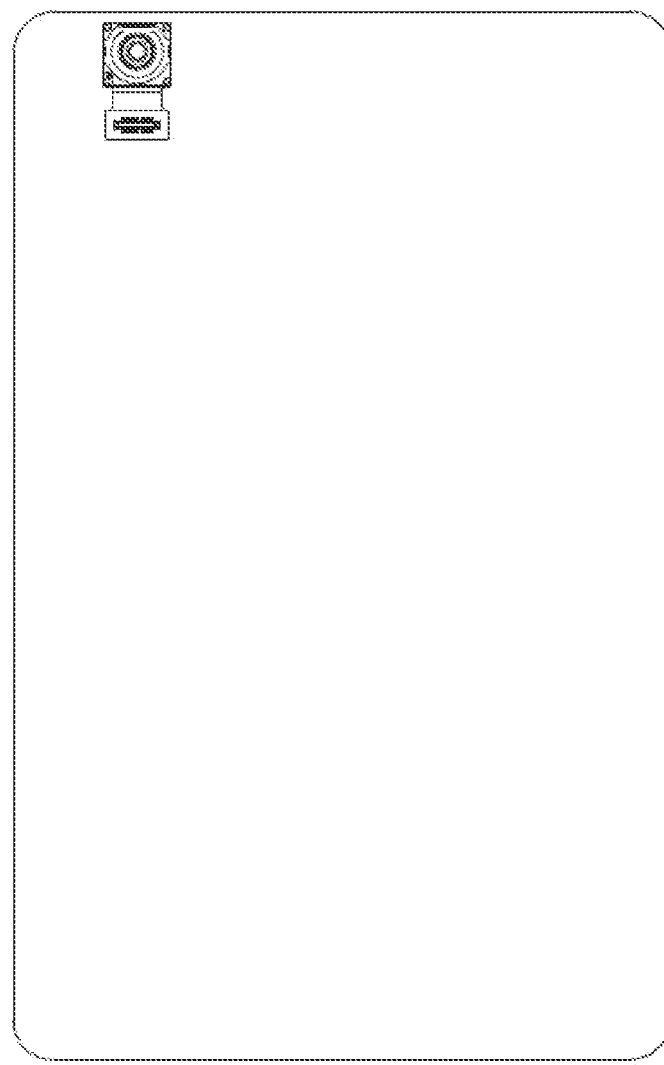
FIG. 10 is a schematic view showing a terminal of an embodiment of the present disclosure.

In another aspect of the embodiments of the present disclosure, a terminal is provided. The terminal may be a mobile phone. Referring to FIG. 10, the terminal may include the above described camera module. Wherein the side of the camera module having the sealing member 40 is close to the edge of the screen.

The sealing member 40 performs a pole as the supporting portion 33 at the first end 101 of the circuit board 10 to share the space that arranging the non-sensitive area of the sensitive chip 20 and the resistors and capacitors of the circuit board 10 as much as possible. Therefore, it is avoided to occupy additional space of the circuit board 10 besides space occupied by the non-sensitive area of the sensitive chip 20 and the resistors and capacitors to arrange the supporting portion 33. Thus the space utilization efficiency is improved and the width of a side of the bracket 30 which arranging the first end 101 of the circuit board 10 in the camera module. When the camera module is assembled on the terminal, the camera module may be disposed close to the upper edge of the screen of the terminal, so that the opening of the camera module on the screen is also close to the upper edge. Therefore, the screen-to-body ratio of the terminal is improved and the user's perception and experience.

In the above description of the camera module and the manufacturing method thereof in the embodiment of the present disclosure, the manner and beneficial of the camera module applied to the display surface of the terminal as a front camera have been described in detail, and will not be repeated here.

The foregoing descriptions are preferred embodiments of the present disclosure, and are not intended to limit the present invention. For those skilled in the art, the present disclosure may have various modifications and changes. Any modification, equivalent replacement and improvement made within the spirit and principle of the present disclosure should be in the scope of the present disclosure.

INDUSTRIAL APPLICABILITY

The camera module of the embodiment of the present disclosure has a bracket with an open side and a sealing member, thus avoiding occupying additional space, improving the space utilization efficiency, reducing the width of the open side, and further minimizing the size of the camera module. The camera module is close to the edge of the screen of the terminal, which increases the screen-to-body ratio of the terminal, and improves user's perception and user experience.

What is claimed is:

1. A camera module, comprising:
a circuit board, the circuit board comprising a first end and a second end parallel to and opposite to the first end in a first horizontal direction, the circuit board comprising a first surface and a second surface facing away from the first surface in a vertical direction;
a sensitive chip, disposed on the first surface of the circuit board, the sensitive chip comprising a sensitive area and a non-sensitive area surrounding the sensitive area;
a bracket, disposed on the first surface of the circuit board and surrounding the sensitive chip, the bracket comprising a plurality of sides, wherein at least one side of the bracket is an open side, and a receiving cavity is defined between a surface of the open side facing the circuit board and the first surface of the circuit board; and
a sealing member, filled in the receiving cavity.

2. The camera module according to claim 1, wherein the bracket is an integrally formed bracket, and in the horizontal direction, a thickness of the open side of the bracket is smaller than a thickness of the other sides of the bracket.

3. The camera module according to claim 1 or 2, wherein the bracket further comprises a protruding portion at least disposed on the open side, the protruding portion is formed from an end of the open side facing the circuit board extends toward the side where the sensitive chip is located, the receiving cavity is defined between a surface of the protruding portion facing the circuit board and the first surface of the circuit board.

4. The camera module according to claim 3, wherein the bracket further comprises a stopper at least disposed on the open side, the stopper extends from an end of the protruding portion which is close to the sensitive chip toward the sensitive chip, a free end of the stopper extending toward the sensitive chip contacts with the non-sensitive area of the sensitive chip.

5. The camera module according to claim 3, wherein the protruding portion is formed on the open side and the side parallel to and opposite to the open side, the camera module further comprises a filter, and the filter is disposed on a surface of the protruding portion which far away from the circuit board.

6. The camera module according to claim 3, wherein the bracket further comprises a side wall at least disposed on the open side, the side wall extends from an end of the protruding portion which far away from the sensitive chip toward a direction away from the circuit board.

7. The camera module according to claim 6, wherein the bracket comprises four sides connected end-to-end, a side disposed at the first end of the circuit board is configured as the open side.

8. The camera module according to claim 7, wherein one or more sides of the bracket adjacent to the open side is configured as the open side.

9. The camera module according to claim 7, wherein each of the four sides of the bracket comprises the protruding portion.

10. The camera module according to claim 7, wherein each of the four sides of the bracket comprises the side wall.

11. The camera module according to claim 6, wherein the side wall and the protruding portion of the open side are integrally formed.

12. The camera module according to claim 3, wherein the bracket further comprises a side wall and a supporting portion disposed on sides of the bracket except the open side, the supporting portion contacts with and fixed to the first surface of the circuit board, the side wall is connected to one end of the supporting portion which far away from the first surface of the circuit board.

13. The camera module according to claim 12, wherein the side wall, the protruding portion, and the supporting portion are integrally formed on the sides except the open side.

14. The camera module according to claim 1, wherein the receiving cavity is defined by at least the open side, the first surface of the circuit board, and the sensitive chip, in the horizontal direction, a side of the receiving cavity away from the sensitive chip is opened.

15. A terminal comprising a screen, and a camera module according to claim 1, a side of the camera module having the sealing member is disposed adjacent to an upper edge of the screen.

16. A method of manufacturing camera module, comprising the following steps:
providing a mother board, the mother hoard comprising a plurality of circuit boards, in a first horizontal direction, each circuit board comprising a first end and a second end parallel to and opposite to the first end;
positioning a sensitive chip on a corresponding position of each circuit board;
assembling a bracket surrounding the periphery of the sensitive chip of each circuit board correspondingly, at least one side of the bracket being configured as an open side, and a receiving cavity being defined between the surface of the open side facing the circuit board and the first surface facing the open side;
forming a sealing member, the sealing member filled in the receiving cavity; and
performing a cutting process to form a semi-finished product of separated camera modules.

17. The method of manufacturing camera module according to claim 16, wherein the mother board comprises a plurality of circuit board groups arranged in a matrix.

18. The method of manufacturing camera module according to claim 17, wherein each circuit board group comprises two circuit boards, and the first ends of the two circuit boards of each circuit board group on the mother board are adjacent to each other without a gap.

19. The method of manufacturing camera module according to claim 16, wherein the step of assembling a bracket surrounding the periphery of the sensitive chip of each circuit board correspondingly comprises:
configuring a side of the bracket at the first end of each circuit board as the open side, so that the open side at the first end of each circuit board being adjacent to the open side at the first end of another circuit board;
assembling the bracket and defining a gap communicating with the receiving cavity between two adjacent open sides to form an adhesive dispensing opening;
the step of forming the sealing member comprises:
injecting glue into the adhesive dispensing opening to filling the receiving cavity, and solidifying the glue.

20. The method of manufacturing camera module according to claim 16, wherein the sealing member is formed by solidifying hot pressing glue or photosensitive glue.

* * * * *